(12) United States Patent
Vu

(10) Patent No.: US 10,984,304 B2
(45) Date of Patent: *Apr. 20, 2021

(54) METHODS FOR PLACING AN EMV CHIP ONTO A METAL CARD

(71) Applicant: Jonny B. Vu, San Jose, CA (US)

(72) Inventor: Jonny B. Vu, San Jose, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/883,858

(22) Filed: Jan. 30, 2018

(65) Prior Publication Data

US 2019/0272457 A1 Sep. 5, 2019

Related U.S. Application Data

(63) Continuation of application No. 15/422,784, filed on Feb. 2, 2017, now Pat. No. 10,336,126.

(51) Int. Cl.
*G06K 19/077* (2006.01)
*G06Q 20/38* (2012.01)
*G06Q 20/34* (2012.01)

(52) U.S. Cl.
CPC ....... *G06K 19/0772* (2013.01); *G06Q 20/341* (2013.01); *G06Q 20/38* (2013.01)

(58) Field of Classification Search
CPC ... G06K 19/0772; G06Q 20/341; G06Q 20/38
See application file for complete search history.

(56) References Cited

U.S. PATENT DOCUMENTS 9,251,458 B2 * 2/2016 Finn ................. G06K 19/07769
9,940,571 B1 * 4/2018 Herrington ...... G06K 19/07722
10,049,362 B2 * 8/2018 Mushing ........... G06Q 20/40145

* cited by examiner

*Primary Examiner* — Seung H Lee
(74) *Attorney, Agent, or Firm* — Intellectual Property Law Group LLP

(57) ABSTRACT

A method for removing an EMV chip from a plastic credit card or debit card and placing the removed EMV chip onto a metal card, includes heating the plastic credit or debit card containing the EMV chip to loosen the EMV chip, the EMV chip being substantially square and planar, the EMV chip having an upward top face, a downward bottom face, and four sides; removing the loosened EMV chip from the plastic credit or debit card; bending the four sides of the EMV chip towards the downward bottom face of the EMV chip; applying an adhesive coating to the bottom face and the bended four sides of the EMV chip; and placing the adhesive coated bottom face and bended four sides of the EMV chip into a holding cavity of the metal card.

12 Claims, 6 Drawing Sheets

METHODS FOR PLACING AN EMV CHIP ONTO A METAL CARD

CROSS-REFERENCE TO RELATED APPLICATIONS

This application is a continuation-in-part application of and claims the benefit of priority under 35 U.S.C. § 120 to U.S. patent application Ser. No. 15/422,784, titled "METHODS FOR PLACING AN EMV CHIP ONTO A METAL CARD," filed on Feb. 2, 2017, the disclosure of which is hereby incorporated by reference in its entirety for all purposes.

FIELD OF THE INVENTION

The invention relates to methods for placing an EMV chip onto a metal card and more particularly, to methods for removing an EMV chip from a plastic credit card or debit card and placing the removed EMV chip onto a stainless steel metal card or debit card.

BACKGROUND OF THE INVENTION

Credit cards and debit cards were originally developed using a magnetic stripe or mechanical imprint to read and record account data, with the customer's signature being used for verification. Under this system, the customer handed their card to the clerk at the point of sale, who either swiped the card through a magnetic reader or made an imprint from the raised text on the card. With the magnetic reader, the system verified the account information and printed a slip for the customer to sign. For the imprinted text, the transaction details were filled in and the customer signed the imprinted slip. In both cases, the clerk verified that the customer's signature matched the signature on the back of the card. While being convenient and useful, this system has a number of security flaws, including the ability to copy the card's information, or by reading and writing the magnetic stripe of the card during a transaction, making these cards easy to duplicate and use without the owner's knowledge.

To address this problem, smart cards (also called chip cards or IC cards) were developed, which have the ability to store a user's account data on an integrated circuit. EMV, which stands for Europay, MasterCard, and Visa, was developed as a technical standard for smart cards and for payment terminals and automated teller machines that can accept them. EMV cards store their data on integrated circuits as well as on magnetic stripes for backward compatibility. These cards can be physically inserted into a card reader or can be read over short distances using radio-frequency identification (RFID) technology. Payment cards that comply with the EMV standard are often called Chip and PIN or Chip and Signature cards, depending on the authentication methods employed by the card issuer.

Most plastic credit cards and debit cards issued by banks and credit card companies are boring and unimpressive to look at for the average consumer. These institutions sometimes offer cards with various sports team designs or "cute" animal designs that may liven up the plastic card's look and appeal, however, the standard bank or credit card company logo is usually included on the card issued to the owner. As such, there is nothing that distinguishes an affluent, sophisticated card holder from an average card holder. Therefore, there remains a need in the art for new types of credit cards and debit cards that are more appealing to the average consumer.

SUMMARY OF THE INVENTION

The invention provides new methods for removing an EMV chip from a plastic credit card or debit card and placing the removed EMV chip onto a metal card, by heating the plastic credit or debit card containing the EMV chip to loosen the EMV chip, the EMV chip being substantially square and planar, the EMV chip having an upward top face, a downward bottom face, and four sides; removing the loosened EMV chip from the plastic credit or debit card; bending the four sides of the EMV chip towards the downward bottom face of the EMV chip; applying an adhesive coating to the bottom face and the bended four sides of the EMV chip; and placing the adhesive coated bottom face and bended four sides of the EMV chip into a holding cavity of the metal card.

DETAILED DESCRIPTION

Figure 1:
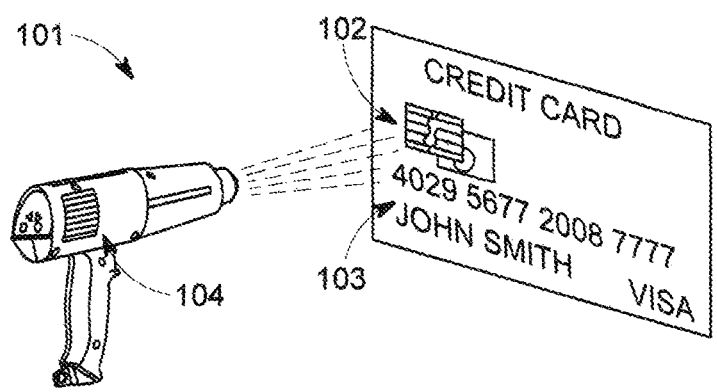
FIG. 1 illustrates an embodiment for removing an EMV chip from a plastic credit card or debit card and placing the removed EMV chip onto a metal card by first heating the plastic credit or debit card containing the EMV chip in order to loosen the EMV chip.

FIG. 1 illustrates an embodiment 101 for removing an EMV chip 102 from a plastic credit card or debit card 103 and placing the removed EMV chip onto a metal card. In order to loosen the EMV chip, the plastic credit or debit card containing the EMV chip is first heated. In an embodiment, heating the plastic credit or debit card includes heating a front face and/or a back face of the card with a heat source such as a heat gun 104, and the like. In an embodiment, the heat source can be set between 350° F. to 400° F. and applied to the front and/or back face of the card for 5 seconds to about 60 seconds. In other embodiments, the heat source can be set at about 370° F. and applied to the front and/or back face of the card for about 10 seconds to 30 seconds. In an embodiment, the EMV chip can be substantially square and planar, the EMV chip having an upward top face, a downward bottom face, and four sides.

In embodiments, the metal card can be made of stainless steel or any other suitable metal or alloy. Further, the metal card can be of any desired colored including but not limited to black, gold (rose, white or yellow gold), titanium, and the like or any combinations thereof. In addition, the metal card can include imprinted information including but not limited to the user's name, account information, and any desired ornamental design.

Figure 2:
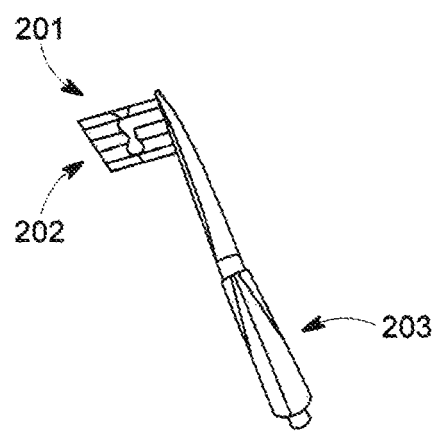
FIG. 2 illustrates an embodiment for removing an EMV chip from a plastic credit card or debit card and placing the removed EMV chip onto a metal card by removing the loosened EMV chip from the plastic credit or debit card.

FIG. 2 illustrates an embodiment 201 for removing an EMV chip from a plastic credit card or debit card 202 and placing the removed EMV chip onto a metal card by removing the loosened EMV chip from the plastic credit or debit card. In an embodiment, a pick and/or tweezers or other similar instruments 203, can be used to loosen or pry off the EMV chip from the plastic credit or debit card.

Figure 3:
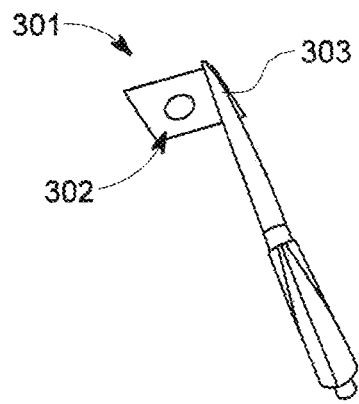
FIG. 3 illustrates an embodiment for removing an EMV chip from a plastic credit card or debit card and placing the removed EMV chip onto a steel metal card by bending the four sides of the removed EMV chip towards the downward bottom face of the EMV chip.

FIG. 3 illustrates an embodiment 301 for removing an EMV chip 302 from a plastic credit card or debit card and placing the removed EMV chip onto a metal card by bending the four sides of the removed EMV chip towards the downward bottom face of the EMV chip by tweezers or other similar instruments 303. In an embodiment, the four sides of the EMV chip can be bent towards the downward bottom face of the EMV chip. In another embodiment, the four sides can be bent towards the downward face of the EMV chip, wherein each of the bended four sides are substantially perpendicular to the downward bottom face.

Figure 4:
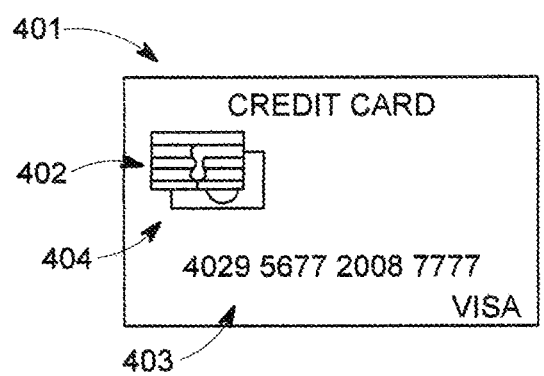
FIG. 4 illustrates an embodiment for removing an EMV chip from a plastic credit card or debit card and placing the removed EMV chip onto a metal card by applying an adhesive coating to the bottom face and the bended four sides of the EMV chip.

FIG. 4 illustrates an embodiment 401 for removing an EMV chip 402 from a plastic credit card or debit card 403 and placing the removed EMV chip onto a metal card by applying an adhesive coating to the bottom face and the bended four sides of the EMV chip. In an embodiment, the adhesive coating can be a cyanoacrylate adhesive coating, for example, ethyl-2-cyanoacrylate. In other embodiments, the adhesive can be one more an epoxy adhesives.

FIGS. 1-4 illustrate various embodiments for removing an EMV chip from a plastic credit card or debit card and placing the removed EMV chip onto a metal card by placing the adhesive coated bottom face and bended four sides of the EMV chip into a holding cavity 404 of the metal card. In an embodiment, the holding cavity in the metal card has sufficient length, width, and depth to hold the EMV chip. In an embodiment, suitable pressure can be applied on the EMV chip in the holding cavity of the metal card for about 10 to about 30 seconds to cure the adhesive. In other embodiments, the EMV chip in the holding cavity of the metal card and the metal card itself can be cleaned with a solution of isopropanol and water to remove any excess adhesive.

The various embodiments described herein for removing an EMV chip from a plastic credit card or debit card and placing the removed EMV chip onto a metal card, can be extended to providing a metal card with more than one EMV chip. For example, the technology allows for the production of a metal card having two EMV chips, in which the two EMV chips may be on the same side of the card, or on opposite sides; a metal credit card having three EMV chips, in which two EMV chips may be on the same side of the card, and the third EMV chip on the opposite side; and a metal credit card having four EMV chips, in which two EMV chips may be on the same side of the card, and the other two EMV chips on the opposite side.

Figure 5:
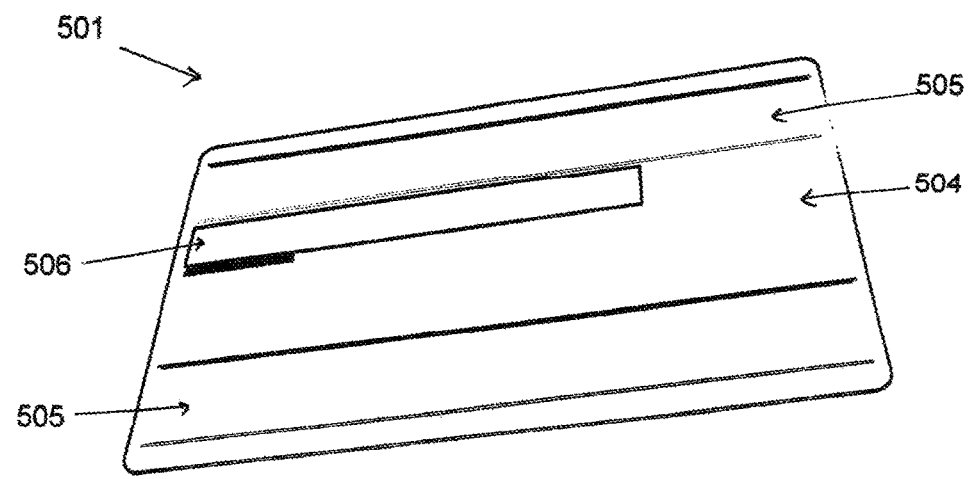
FIG. 5 illustrates an embodiment of two EMV chips taken from a plastic credit card or debit card, which have been placed into a top face of a metal card.
Figure 5:
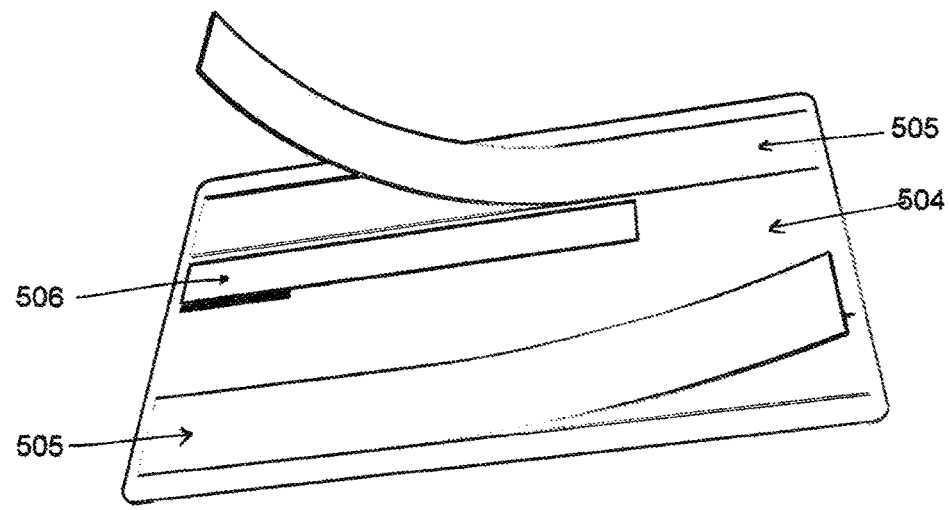
Figure 5:
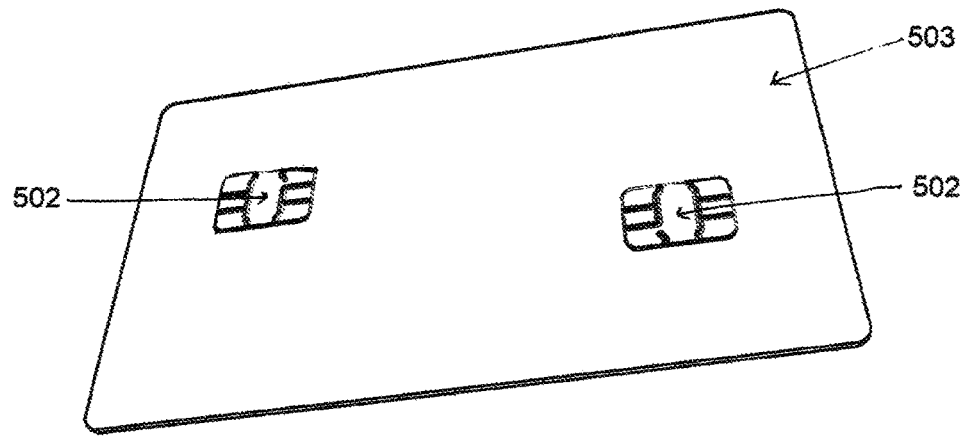

For example, FIG. 5 illustrates an embodiment 501 of two EMV chips 502 taken from a plastic credit card or debit card, which have been placed into a top face of a metal card 503. Also shown is the back of the metal card 504 optionally including magnetic strips 505 and a signature space 506.

Figure 6:
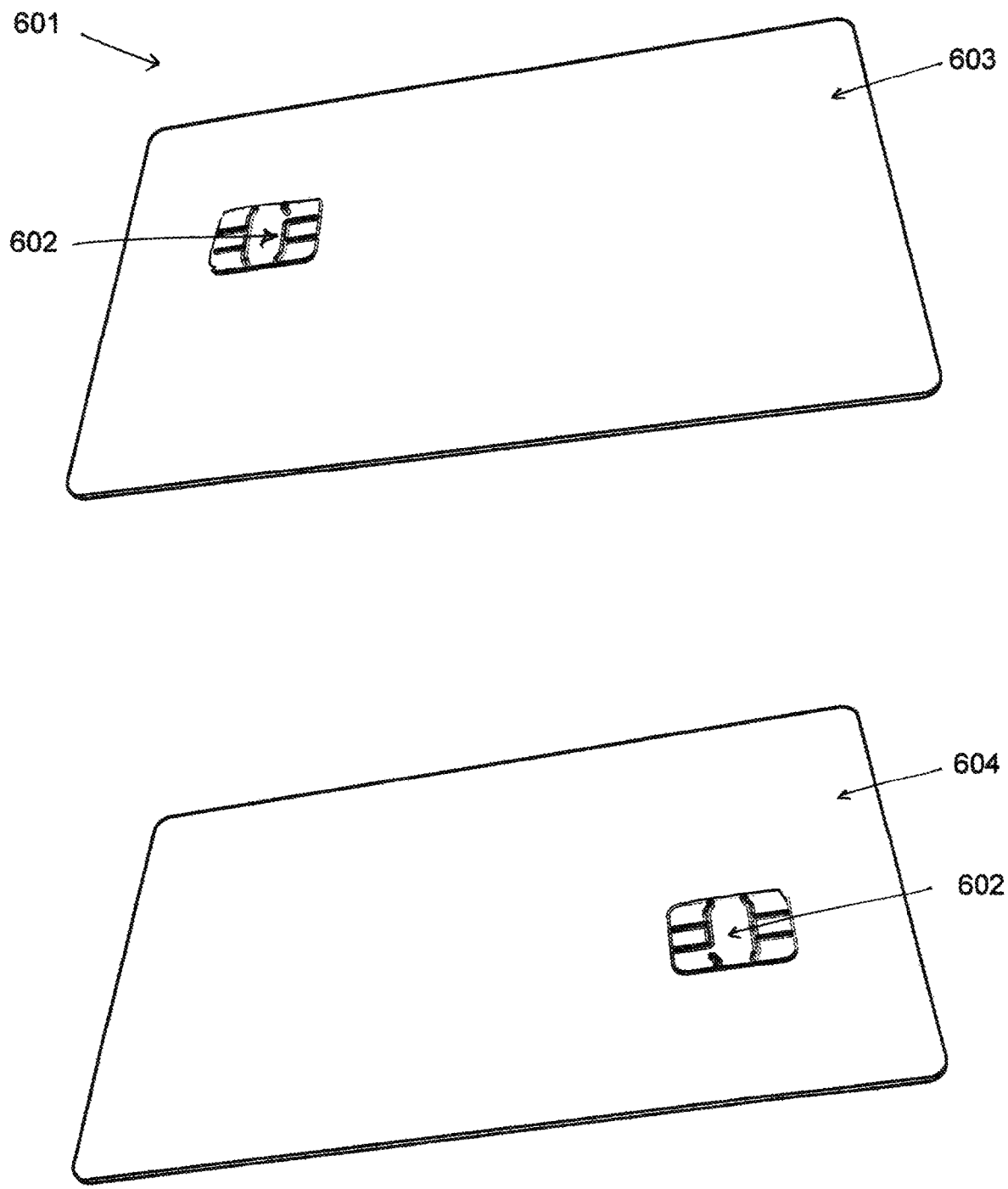
FIG. 6 illustrates an embodiment of two EMV chips taken from a plastic credit card or debit card, in which one EMV chip has been placed into a top face of a metal card and the other EMV chip has been placed into the bottom face of a metal credit card.

In another example, FIG. 6 illustrates an embodiment 601 of two EMV chips 602 taken from a plastic credit card or debit card, in which one EMV chip 602 has been placed into a top face of a metal card 603 and the other EMV chip 602 has been placed into the bottom face of a metal credit card 604.

Figure 7:
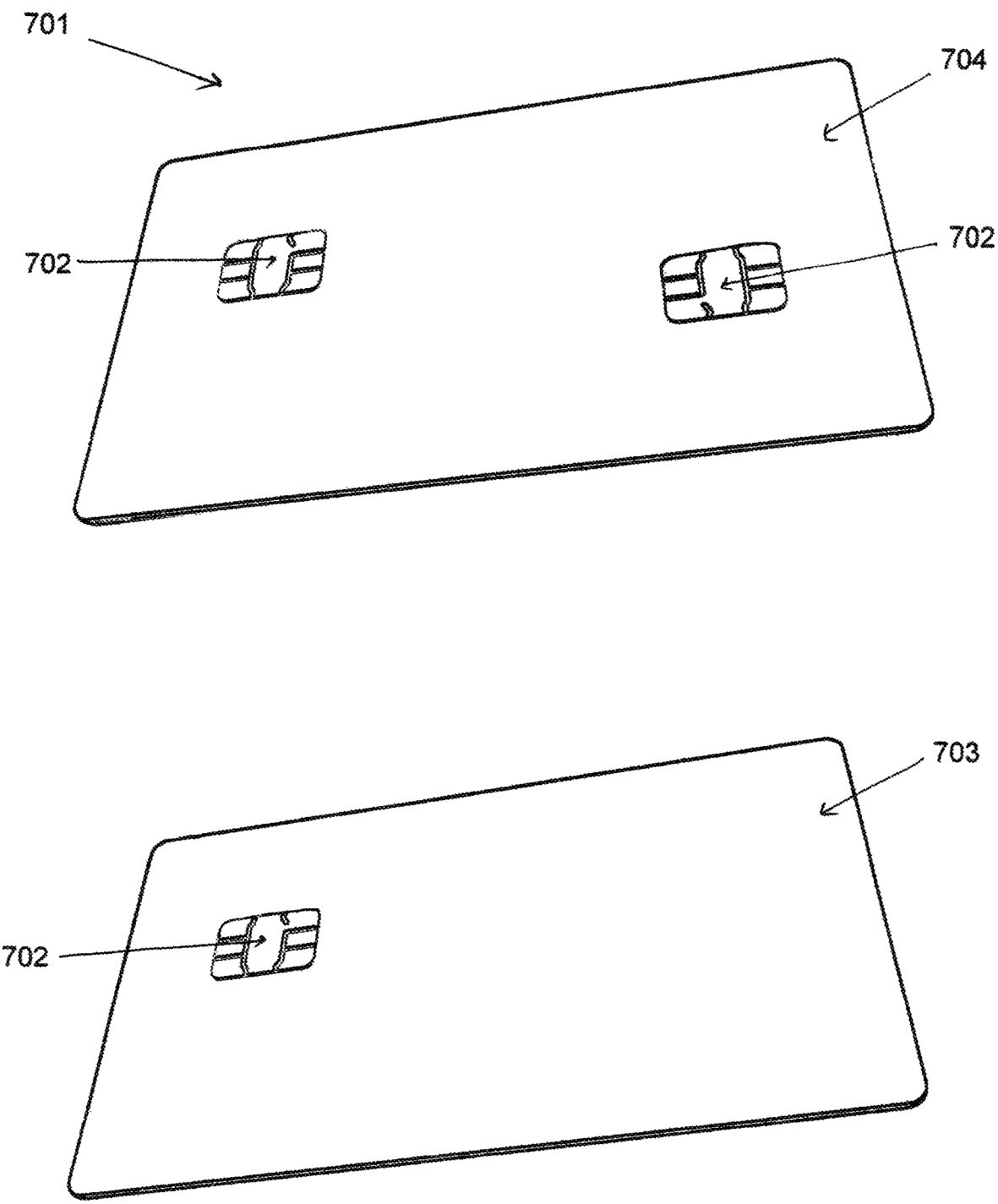
FIG. 7 illustrates an embodiment of three EMV chips taken from a plastic credit card or debit card, in which one EMV chip has been placed into a top face of a metal card and the other two EMV chip have been placed into the bottom face of a metal credit card.

In another example, FIG. 7 illustrates an embodiment 701 of three EMV chips 702 taken from a plastic credit card or debit card, in which one EMV chip 702 has been placed into a top face of a metal card 703 and the other two EMV chips 702 have been placed into the bottom face of a metal credit card 704. Alternatively, two EMV chips can be placed into a top face of a metal card and the other EMV chip can be placed into the bottom face of a metal credit card.

Figure 8:
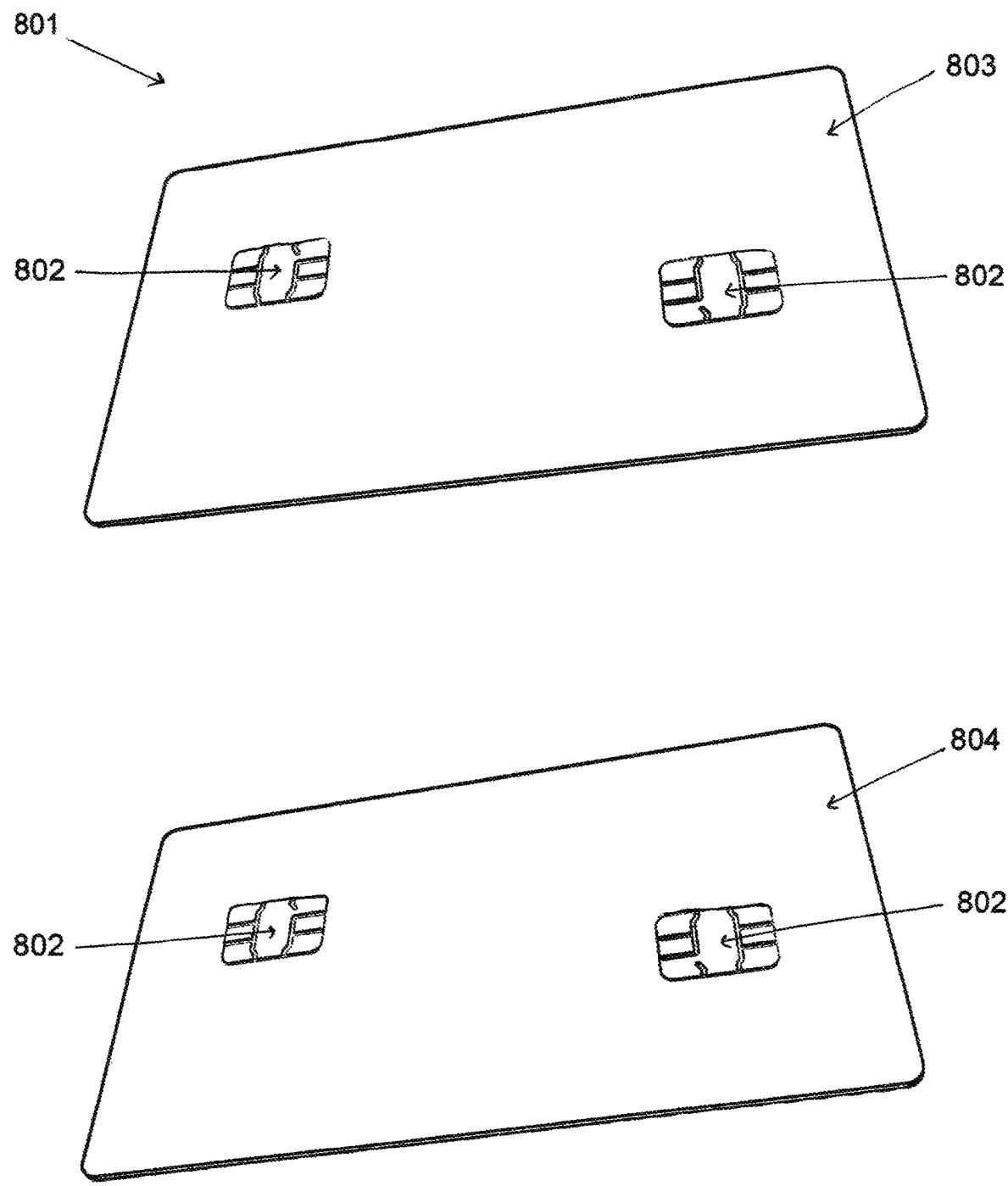
FIG. 8 illustrates an embodiment of four EMV chips taken from a plastic credit card or debit card, in which two EMV chips have been placed into a top face of a metal card and the other two EMV chips have been placed into the bottom face of a metal credit card.

In another example, FIG. 8 illustrates an embodiment 801 of four EMV chips 802 taken from a plastic credit card or debit card, in which two EMV chips 802 have been placed into a top face of a metal card 803 and the other two EMV chips have been placed into the bottom face of a metal credit card 804.

Thus, in another embodiment the disclosure provides methods for removing one or more EMV chips from one or more plastic credit cards or one or more debit cards and placing the removed one or more EMV chips onto a metal card, which includes heating the one or more plastic credit cards or the one or more debit cards containing the one or more EMV chips to loosen the one or more EMV chips, each of the one or more EMV chips being substantially square and planar, each of the one or more EMV chips having an upward top face, a downward bottom face, and four sides; removing each of the loosened one or more EMV chips from the one or more plastic credit cards or the one or more debit cards; bending the four sides of each of the one or more EMV chips towards the downward bottom face of each of the one or more EMV chips; applying an adhesive coating to the bottom face and the bended four sides of each of the one or more EMV chips; and placing the adhesive coated bottom face and bended four sides of each of the one or more EMV chips into a separate holding cavity of the metal card.

In other embodiments, the disclosure provides methods for removing one or more EMV chips from one or more plastic credit cards or one or more debit cards and placing the removed one or more EMV chips onto a metal card, which further include heating a front face and a back face of the one or more plastic credit cards or the one or more debit cards containing the one or more EMV chips with a heat gun to loosen each of the one or more EMV chips.

In another embodiment, the disclosure provides methods for removing one or more EMV chips from one or more plastic credit cards or one or more debit cards and placing the removed one or more EMV chips onto a metal card, which further includes heating the front face and the back face of the one or more plastic credit cards or the one or more debit cards containing the one or more EMV chips with a heat gun from between about 350° F. to about 400° F.

In other embodiments, the disclosure provides methods for removing one or more EMV chips from one or more plastic credit cards or one or more debit cards and placing the removed one or more EMV chips onto a metal card, which further includes heating the front face and the back face of the one or more plastic credit cards or the one or more debit cards containing the one or more EMV chips with a heat gun at about 370° F. for about 10 seconds to about 30 seconds.

In other embodiments, the disclosure provides methods for removing one or more EMV chips from one or more plastic credit cards or one or more debit cards and placing the removed one or more EMV chips onto a metal card, which further includes removing the loosened one or more EMV chips from the one or more plastic credit cards or the one or more debit cards using a pick.

In other embodiments, the disclosure provides methods for removing one or more EMV chips from one or more plastic credit cards or one or more debit cards and placing the removed one or more EMV chips onto a metal card, which further includes bending the four sides of each of the one or more EMV chips towards the downward bottom face of each of the one or more EMV chips, each of the bended four sides being substantially perpendicular to the downward bottom face.

In other embodiments, the disclosure provides methods for removing one or more EMV chips from one or more plastic credit cards or one or more debit cards and placing the removed one or more EMV chips onto a metal card, which further includes applying a cyanoacrylate adhesive coating to the bottom face and the bended four sides of each of the one or more EMV chips in each of the separate holding cavities of the metal card.

In other embodiments, the disclosure provides methods for removing one or more EMV chips from one or more plastic credit cards or one or more debit cards and placing the removed one or more EMV chips onto a metal card, wherein the cyanoacrylate adhesive coating comprises ethyl-2-cyanoacrylate.

In other embodiments, the disclosure provides methods for removing one or more EMV chips from one or more plastic credit cards or one or more debit cards and placing the removed one or more EMV chips onto a metal card, which further includes applying pressure on each of the one or more EMV chips in the separate holding cavity of the metal card for about 10 to about 30 seconds to cure the adhesive.

In other embodiments, the disclosure provides methods for removing one or more EMV chips from one or more plastic credit cards or one or more debit cards and placing the removed one or more EMV chips onto a metal card, which further includes cleaning each of the one or more EMV chips in the separate holding cavities of the metal card and the metal card with a solution of isopropanol and water to remove any excess adhesive.

In other embodiments, the disclosure provides methods for removing one or more EMV chips from one or more plastic credit cards or one or more debit cards and placing the removed one or more EMV chips onto a metal card, wherein the metal card is a stainless-steel metal card.

In another embodiment, the disclosure provides a metal credit card or a metal debit card, which includes two or more EMV chips arranged on a top face or a bottom face of the metal credit card or the metal debit card.

In other embodiments, the disclosure provides a metal credit card or a metal debit card, wherein one of the two or more EMV chips is arranged on the top face of the metal credit card or metal debit card, and another of the two or more EMV chips are arranged on the bottom face of the metal credit card or metal debit card.

In other embodiments, the disclosure provides a metal credit card or a metal debit card, wherein one of the two or more EMV chips is arranged on the top face of the metal credit card or metal debit card, and two of the two or more EMV chips are arranged on the bottom face of the metal credit card or metal debit card.

In other embodiments, the disclosure provides a metal credit card or a metal debit card, wherein one of the two or more EMV chips is arranged on the bottom face of the metal credit card or metal debit card, and two of the two or more EMV chips are arranged on the top face of the metal credit card or metal debit card.

In other embodiments, the disclosure provides a metal credit card or a metal debit card, wherein two of the two or more EMV chips are arranged on the top face of the metal credit card or metal debit card, and two of the two or more EMV chips are arranged on the bottom face of the metal credit card or metal debit card.

In other embodiments, the disclosure provides a metal credit card or a metal debit card, wherein the metal card and the metal debit card is a stainless-steel metal credit card or a stainless-steel metal debit card.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A metal card, comprising:
   two or more EMV chips that have been removed from a payment card issued from a bank or a credit card company and transferred to the metal card, the two or more EMV chips arranged on a top face or a bottom face of the metal card such that a user makes a transaction on multiple financial accounts from one card by rotating the metal card to bring the two or more EMV chips in close proximity to a reader.

2. The metal card of claim 1, wherein one of the two or more EMV chips is arranged on the top face of the metal card and another of the two or more EMV chips are arranged on the bottom face of the metal card.

3. The metal card of claim 1, wherein one of the two or more EMV chips is arranged on the top face of the metal card and two of the two or more EMV chips are arranged on the bottom face of the metal card.

4. The metal card of claim 1, wherein one of the two or more EMV chips is arranged on the bottom face of the metal card and two of the two or more EMV chips are arranged on the top face of the metal card.

5. The metal card of claim 1, wherein two of the two or more EMV chips are arranged on the top face of the metal card and two of the two or more EMV chips are arranged on the bottom face of the metal card.

6. The metal card of claim 1, wherein the metal card is a stainless-steel metal card.

7. A metal card, comprising:
two or more EMV chips that have been removed from a payment card issued from a bank or a credit card company and transferred to the metal card, the two or more EMV chips arranged on a top face or a bottom face of the metal card such that a user makes a transaction on multiple financial accounts from one card by rotating one of the two or more EMV chips toward a reader.

8. The metal card of claim 7, wherein one of the two or more EMV chips is arranged on the top face of the metal card and another of the two or more EMV chips are arranged on the bottom face of the metal card.

9. The metal card of claim 7, wherein one of the two or more EMV chips is arranged on the top face of the metal card and two of the two or more EMV chips are arranged on the bottom face of the metal card.

10. The metal card of claim 7, wherein one of the two or more EMV chips is arranged on the bottom face of the metal card and two of the two or more EMV chips are arranged on the top face of the metal card.

11. The metal card of claim 7, wherein two of the two or more EMV chips are arranged on the top face of the metal card and two of the two or more EMV chips are arranged on the bottom face of the metal card.

12. The metal card of claim 7, wherein the metal card is a stainless-steel metal card.

* * * * *